April 29, 1952 W. E. McCABE, JR Re. 23,487

FILL AND DISCHARGE VALVE FOR LIQUEFIED HYDROCARBON CONTAINERS

Original Filed March 30, 1949

INVENTOR.
William E. McCabe, Jr.
BY
Martin E. Anderson
ATTORNEY

Reissued Apr. 29, 1952

Re. 23,487

UNITED STATES PATENT OFFICE 23,487

FILL AND DISCHARGE VALVE FOR LIQUEFIED HYDROCARBON CONTAINERS

William E. McCabe, Jr., Denver, Colo.

Original No. 2,543,920, dated March 6, 1951, Serial No. 84,428, March 30, 1949. Application for reissue August 31, 1951, Serial No. 244,537

9 Claims. (Cl. 62—1)

Matter enclosed in heavy brackets [ ] appears in the original patent but forms no part of this reissue specification; matter printed in italics indicates the additions made by reissue.

This invention relates to storage systems for liquid hydrocarbons, and more particularly to improvements in filler valves for same which serve also as withdrawal valves.

In certain rural and other communities which are not supplied with natural or manufactured gas the use of certain liquid hydrocarbons, such as propane and butane, is becoming increasingly popular for domestic and other uses. Also, it has been found that these fuels have certain advantages over gasoline or similar distillates for use in tractors and the like.

When it is desired to employ the hydrocarbons for the latter purpose, the tractor is provided with a tank for the hydrocarbon which is filled periodically from a suitable storage tank. This storage tank may either be separate from that which stores the hydrocarbon for domestic use, such as in a gas range, or the domestic use tank may be employed as the storage source for the tractor if suitable provision be made to withdraw liquid therefrom. The latter, of course, requires special outlet fittings which add to the complexity of the tank.

The present invention has for its principal object the provision of a valve system for hydrocarbon storage tanks which permits two way flow therethrough, that is, the tank may be filled, or liquid withdrawn therefrom, the valve system having all safety requirements regardless of direction of flow.

Another object is to provide a valve system which incorporates an excess flow check valve and check valve in series, in which the check valve may be rendered inoperative, as such, and controlled as an ordinary globe or other valve.

A further object is to provide a valve system of the foregoing type which may be installed in present hydrocarbon tanks without changing the fittings provided thereon, or adding others.

Still further objects, advantages, and salient features will become more apparent from a consideration of the description to follow, the appended claims, and the accompanying drawing, in which:

Figure 1:
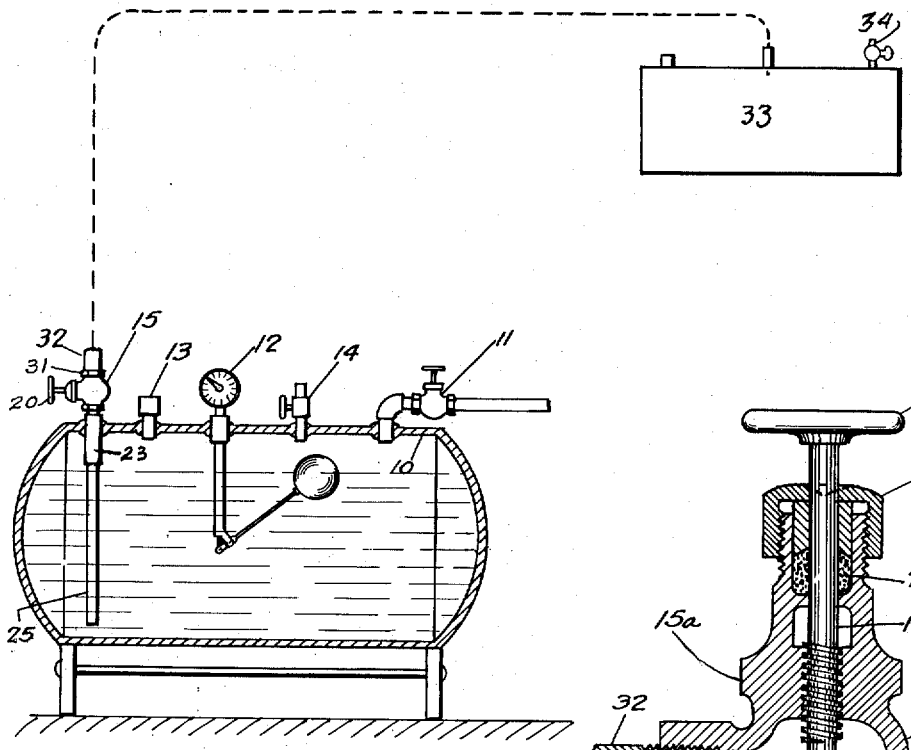
Figure 1 is a longitudinal cross section through a conventional hydrocarbon tank, showing diagrammatically the manner in which a tractor tank, or other, is filled therefrom.

Referring in detail to the drawing, and particularly Figure 1, a conventional hydrocarbon storage tank 10 is illustrated, this tank being provided with the usual service valve 11, which permits delivery of fuel to a gas range, or other burner, suitable pressure reducing and safety valve equipment (not shown) being interposed in the delivery line, all as understood in the art. The tank is also provided with the conventional liquid level gage 12, a relief valve 13, and a vapor equalizing valve 14 which is employed during the filling operation, all of these parts, their purpose, and manner of operation also being well understood in the art.

Figure 3:
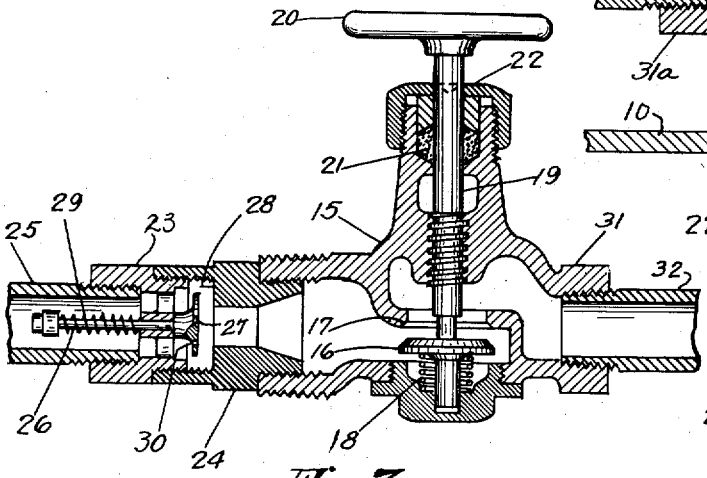
Figure 3 is a similar view through an alternative form of valve system.

The valve, shown somewhat diagrammatically in Figure 3, is provided with a valve body 15 having a check valve 16 which is urged toward valve seat 17 by a spring 18. This valve may be opened by a threaded valve stem 19, controlled by hand wheel 20, any suitable packing 21 being provided which may be compressed by a pack nut 22.

An excess flow check valve 23 is secured to valve body 15 in any suitable manner, such as by threaded fitting 24. This valve is disposed on the downstream side of the valve 15, a dip tube 25 being connected thereto which extends to near the bottom of tank 10. This valve comprises a valve stem 26 having a valve head 27 secured thereto at one end thereof, the valve head being adapted to seat on valve seat 28, under certain conditions as will hereinafter appear. The valve is normally held open by a spring 29. The valve head is also provided with a small bleed hole 30 which permits equalization of pressure on the upstream and downstream sides thereof under certain conditions.

Valves of the foregoing type are well known in the art and operate in such manner that they are normally open to permit flow in one direction but close upon a reverse flow when such flow tends to exceed a certain predetermined value. Thus, they are similar to ordinary check valves but differ in that they close upon reverse flow only after the rate of such flow has reached the particular value for which they are set, whereas the ordinary check valve tends to close upon any reverse flow. After a valve of this type has closed in response to an excess reverse flow there is a small amount of leakage through the bleed hole 30. After any valve upstream, such as valve 16, has been closed leakage will continue to occur until the pressure between such upstream valve and the excess flow valve is the same as tank pressure after which the excess valve will open in response to the urge of its spring.

Figure 2:
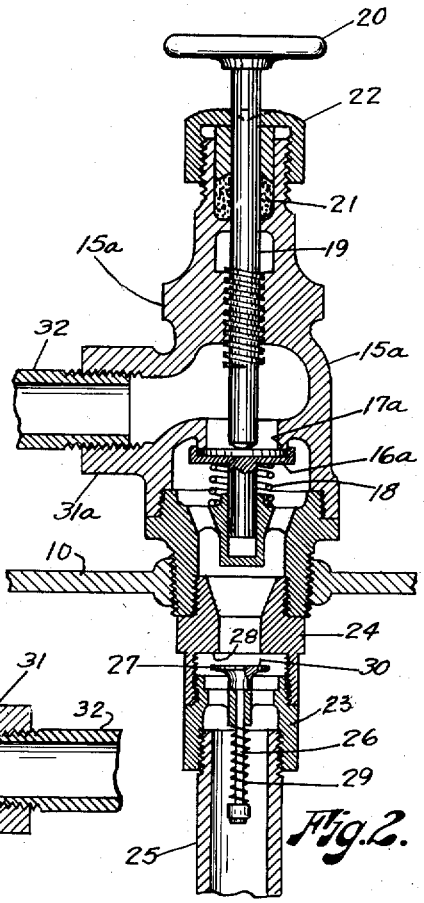
Figure 2 is a longitudinal section through the filler valve system which constitutes the subject of the invention.

In Figure 2 is shown an alternative form of the invention, the essential difference between the construction previously described, being that valve body 15a has a side opening 31, as shown in Figure 3. The shape of the valve and seat differs slightly, also, but is of no material importance and any suitable type of check valve may be employed in either of the constructions.

The manner of operation of both of the embodiments shown in Figures 2 and 3 is identical and will now be described. Assuming that it is desired to fill tank 10 with a hydrocarbon such as propane or butane, a suitable conduit 32 is connected to valve 15 (or 15a) with valve stem 19 in a position such that check valve 16 (or 16a) is on its seat, the conduit being connected to a source of supply which will usually be a large tank mounted on a truck. A valve at the truck is then opened to deliver the hydrocarbon to tank 10, the pressure in the supply line being greater than in the tank 10. In event the filling conduit, which is usually a hose, should rupture while the tank is being filled check valve 16 will automatically close preventing loss of the hydrocarbon from tank 10, which is normally under considerable pressure.

Assuming now that it is desired to remove some of the hydrocarbon from tank 10 to fill a tank 33 which may be on a tractor, or the like, the tractor is driven to a point near tank 10 and the two tanks are connected by a suitable conduit 32 and vent 34 opened reducing the pressure in tank 33 to a value below the pressure in tank 10. Check valve 16 (or 16a) is now moved away from its seat by hand wheel 20. The hydrocarbon then flows from tank 10 to tank 33. If the conduit should rupture during this operation, the excess flow check valve will automatically close thus preventing loss of the hydrocarbon. The operator will then permit the check valve 16 to return to its seat by manipulation of the handwheel 20. The pressure will then equalize on the two sides of the excess flow valve through vent 30, as explained previously, after which such valve returns to its normally open position. The valves then remain in this position until filling is resumed.

It is to be observed that the excess flow valve is disposed within the tank. This is essential to meet certain safety codes so that if the valve 15 should be broken from the tank the excess flow valve will close to prevent loss of the hydrocarbon. In some installations, the fill valve, which is usually an ordinary globe, valve or the like, is provided with a weakened portion so that it may be broken off without rupturing any portion of the fill system downstream thereof. It is apparent that this type of construction may be employed in the present invention, if so desired.

This invention is to be distinguished from any prior art wherein separate filling and removing means are supplied on the tank. So far as is known, no prior art filling device may be employed both to fill and remove the hydrocarbon and still have the required safety features during filling and removal of the hydrocarbon. With the construction of the present invention a single valve system is provided which fits into the same tank fitting formerly occupied by the filling valve. This construction is simpler than one in which separate supply and discharge means are provided and also eliminates any changes in the tank construction since the device may be installed in the same place occupied by the present filling means. While the invention has been disclosed for use with liquified hydrocarbons it will become apparent that the valve system may be employed with other liquified gas containers such as anhydrous ammonia, or other refrigerants.

I claim:

1. A safety fill and drain device for storage tanks for liquified gases, comprising; a conduit having one end adapted to extend below the surface of liquid in the tank, a normally open excess flow valve in series with the other end of the conduit, a valve body having a normally closed check valve therein in series with the excess flow valve, a fill and drain conduit, such as a hose, in series with the check valve adapted to be detachably connected thereto, and means carried by said body and movable between inoperative and operative positions for selectively operating the check valve to hold it open, said means being operable independently of the attachment of the conduit to the check valve, the construction and arrangement being such that when said means is in inoperative position the check valve is automatically opened during filling of the tank from a source of liquid supply and automatically closes when the pressure in the tank exceeds the pressure in the second named conduit, and the excess flow valve closes when reverse flow therethrough exceeds a predetermined rate when said means is in operative position and the check valve is held open thereby, whereby the first named conduit may be employed to fill the tank or drain it, and flow therethrough will be discontinued if the second named conduit should rupture during filling of the tank or draining it.

2. A storage system for liquified gases, comprising; a tank for containing the gas, a dip tube having one end disposed below the surface of liquid in the tank, a normally open excess flow valve in series with the other end of the dip tube, a valve body having a normally closed check valve therein in series with the excess flow valve, a fill and drain conduit in series with the check valve adapted to be detachably connected thereto, and means carried by said body and movable between inoperative and operative positions for selectively operating the check valve to hold it open, said means being operable independently of the attachment of the conduit to the check valve, the construction and arrangement being such that when said means is in inoperative position the check valve is automatically opened during filling of the tank from a source of liquid supply and automatically closes when the pressure in the tank exceeds the pressure in the conduit, and the excess flow valve closes when reverse flow therethrough exceeds a predetermined rate when said means is in operative position and the check valve is held open thereby, whereby the dip tube may be employed to fill the tank or drain it, and flow therethrough will be discontinued if said conduit should rupture during filling of the tank or draining it.

3. In a tank for storing liquified gases of the type provided with a single opening therein for receiving means for filling the tank, the improvement which comprises a replacement device for said filling means comprising means secured to said opening, said means including a dip tube having one end disposed below the surface of liquid in the tank, a normally open excess flow valve in series with the other end of the dip tube, a valve body having a normally closed check valve therein in series with the excess flow valve, a fill and drain conduit in series with the check valve adapted to be detachably connected thereto, and means carried by said body and movable between inoperative and operative positions for operating the check valve to hold it open, said means being operable independently of the attachment of the conduit to the check valve, the construction and arrangement being such that when said means is in inoperative position the check valve is automatically opened during filling of the tank from a source of liquid supply and automatically closes when the pressure in the tank exceeds the pressure in the conduit, and the excess flow valve closes when reverse flow therethrough exceeds a predetermined rate when said means is in operative position and the check valve is held open thereby, whereby the dip tube may be employed to fill the tank or drain it, and flow therethrough will be discontinued if said conduit should rupture during filling of the tank or draining it.

4. Safety fill and drain apparatus for tanks containing liquified gases, comprising; a single fill and drain tube having one end adapted to extend below the surface of liquid in the tank, a fill and drain valve system having a normally closed check valve in communication with the other end of said tube adapted to automatically open during filling of the tank and automatically close when the pressure in the tank exceeds the pressure in a conduit connected to a filling source, and a normally open excess flow valve in communication with said other end of the tube adapted to close during draining of the tank when reverse flow through the tube exceeds a predetermined rate, a drain conduit, such as a hose, adapted to be detachably connected to the valve system, the excess flow valve being interposed between said conduit and said tube, and means carried by the valve system, independent of the hose, and operable independent of the attachment of the drain conduit to the valve system for establishing communication from said tube, through the excess flow valve, and to the drain conduit, whereby the single tube may serve to fill and drain the tank and flow therethrough will be discontinued if a conduit connected to the valve system should rupture during filling or draining.

5. In a tank for storing liquified gases of the type provided with a single opening therein for receiving means for filling the tank, the improvement which comprises; a device for said filling means comprising means secured to said opening adapted to fill and drain the tank, said means including a dip tube secured to the opening and having one end extending below the liquid level in the tank, a fill and drain valve system having a normally closed check valve in communication with the other end of said tube adapted to automatically open during filling of the tank and automatically close when the pressure in the tank exceeds the pressure in a conduit connected to a filling source, and a normally open excess flow valve in communication with said other end of the tube adapted to close during draining of the tank when reverse flow through the tube exceeds a predetermined rate, a drain conduit, such as a hose, adapted to be detachably connected to the valve system, the excess flow valve being interposed between said conduit and said tube, and means carried by the valve system, independent of said conduit, and operable independent of the attachment of said conduit to the valve system for establishing communication from said tube, through the excess flow valve, and to said conduit, whereby the single tube may serve to fill and drain the tank and flow therethrough will be discontinued if a conduit connected to the valve system should rupture during filling or draining.

*6. A device in accordance with claim 5 wherein said last named means is provided with internally threaded openings at its ends.*

*7. A device in accordance with claim 5 wherein said last named means is constructed to form a normally permanent part of the system at all times during both filling and draining of the tank and includes a manually operable valve actuating member movably carried thereby disposed between its ends.*

*8. A device in accordance with claim 7 wherein the manually operable valve actuating member includes a rotatable portion.*

*9. A device in accordance with claim 8 wherein said rotatable portion is disposed on a threaded stem adapted to bodily move axially as the stem rotates.*

WILLIAM E. McCABE, JR.

REFERENCES CITED

The following references are of record in the file of this patent or the original patent:

UNITED STATES PATENTS

| Number | Name | Date |
|---|---|---|
| 788,985 | Youtz | May 2, 1905 |
| 2,179,144 | Buttner | Nov. 7, 1939 |
| 2,194,501 | Hooper et al. | Mar. 26, 1940 |
| 2,326,187 | White | Aug. 10, 1943 |